United States Patent [19]
Vandervelde et al.

[11] Patent Number: 5,632,896
[45] Date of Patent: May 27, 1997

[54] METHOD FOR TREATING SEWAGE AND OTHER LIQUIDS

[76] Inventors: Don M. Vandervelde, 5409 Huntwick Dr. NW., Gig Harbor, Wash. 98335; Glenn J. Helm, 1616 Dawn Rd., Bremerton, Wash. 98310

[21] Appl. No.: 496,658

[22] Filed: Jun. 29, 1995

Related U.S. Application Data

[60] Continuation of Ser. No. 156,085, Nov. 22, 1993, abandoned, which is a division of Ser. No. 711,560, May 30, 1991, Pat. No. 5,281,332, which is a continuation of Ser. No. 467,141, Jan. 18, 1990, abandoned, which is a continuation-in-part of Ser. No. 404,894, Sep. 8, 1989, Pat. No. 4,997,568.

[51] Int. Cl.$^6$ ............................................. C02F 3/06
[52] U.S. Cl. .......................... 210/617; 210/631; 210/691; 210/750; 210/807
[58] Field of Search ............................. 210/615–618, 210/631, 672, 691, 692, 694, 750, 807

[56] References Cited

U.S. PATENT DOCUMENTS

| | | | |
|---|---|---|---|
| 3,238,124 | 3/1966 | Burton | 210/615 |
| 3,617,541 | 11/1971 | Pan | 210/615 |
| 3,957,634 | 5/1976 | Orensten et al. | 210/615 |
| 4,169,050 | 9/1979 | Serfling et al. | 210/615 |
| 4,411,780 | 10/1983 | Suzuki et al. | 210/615 |
| 4,422,930 | 12/1983 | Hatanaka | 210/615 |

*Primary Examiner*—Thomas G. Wyse
*Attorney, Agent, or Firm*—R. Reams Goodloe, Jr.

[57] ABSTRACT

A method for complete treatment of septic tank effluent or other contaminated liquid by contriving for it to flow in an ultra-thin film over a surface treatment medium such as fabric or sand. It provides diffusive aeration, biological reaction and physical filtration on a molecular scale.

The device transfers contaminated water, or other liquid, from a container to a final collector completely purifying the liquid in the process. The purified effluent can then be reused for household, industrial, irrigation or other uses, or disposed of as normal surface run-off in streams or lakes.

To increase efficiency, said container encloses a progressively more finely pored media precisely situated with effluent seeping gradually through progressively finer pores to provide uniquely effective pretreatment.

29 Claims, 5 Drawing Sheets

2

METHOD FOR TREATING SEWAGE AND OTHER LIQUIDS

This application is a continuation of Ser. No. 08/156,085, filed Nov. 22, 1993, now abandoned; that application was a divisional of Ser. No. 07/711,560, filed May 30, 1991 now U.S. Pat. No. 5,281,332, issued Jan. 25, 1994; that application was a continuation of Ser. No. 07/467,141, filed Jan. 18, 1990, now abandoned; that application was a continuation-in-part of Ser. No. 404,894, filed Sep. 8, 1989, now U.S. Pat. No. 4,997,568, issued Mar. 5, 1991.

BACKGROUND OF THE INVENTION

This invention relates to a unique method for purification of sewage, waste water or potable water by thin film aeration and a special prefilter, described in Vandervelde and Helm's U.S. Pat. No. 4,997,568 Mar. 5, 1991. This is a division of Ser. No. 07/1711560 Filed May 30, 1991.

Historically, water purification has taken advantage, in some cases, of aerobic or anaerobic biological devices to produce improved effluent using biota fixed on a substrate, or suspended. Anaerobic devices have traditionally been limited to a maximum of about 70%–80% treatment and proposed as pretreatment stages prior to some further action, as in E. J. Jordon's (U.S. Pat. Nos. 3,950,252 April 1976 & 4,211,655 July 1980), A. A. Monson's (U.S. Pat. No. 4,162,976 July 1979), and A. W. Green's (U.S. Pat. No. 4,293,421 October 1981).

Sewage and waste water disposal is becoming a bottle-neck in providing housing and employment for an increasing population. As sewage treatment standards become stricter and availability of clean water more restricted, the cost of providing these services rises. The result is people with substandard or unavailable housing and unemployment in many communities.

Extending and constructing standard municipal sewage plants to accommodate higher population densities is envi-romnentslly unsound and becoming cost prohibitive. These systems inject poisonous disinfectants, pollute the surface water into which they discharge and prevent normal beneficial recharge of aquifers.

Standard on-site septic systems, to work well, require special soil and ground water conditions with large lot sizes. These factors are also becoming less available and more expensive as development proceeds. They discharge incompletely treated effluent into the environment.

More exotic and costly on-site septic systems designed to treat sewage under poor soil and ground water conditions are being used to fill the gap. These include Wisconsin Mound Systems, sand filters and a proliferation of types of mechanical aerobic reactors, many of which use the chemical disinfectants that repollute their effluent. These expensive systems do a passable job if designed, installed, and maintained properly. However, they seldom are because of their inherent complexity. This results in discharge of untreated or poorly treated sewage to pollute ground and surface water. Pumps and other mechanical devices that they require are often beyond the owner's financial capability, or interest, to maintain.

Commonly used sand and gravel falters rely on mechanical devices to increase the air/sewage interface by spraying, sparging, or spreading it over sand, gravel, or soil beds. This allows the growth of aerobic biota which treat the sewage. One of the most advanced and effective examples of this type is covered by U.S. Pat. No. 4,251,359, merchandised by SPEC Industries.

While investigating ultra-thin water film formation, we found that sewage caused to flow in a film over a hydrophilic surfaces, such as cotton cloth or sand, left its impurities behind and could then be released by gravity in liquid form into a collector. This resulted in a pooled, pure product free of odor and contamination while freeing the medium surface to absorb more film.

We believe that further review of patents and literature will not reveal a method or device which can accomplish this treatment as we have. Advantages of this invention are submitted in the Summary.

SUMMARY OF THE INVENTION

This patent combines sui generis use of natural forces to completely purify water by exposing it to a very large hydrophilic solid surface, in one case extending up from the contaminated water surface, over the edge of its container and down to a collector at a lower elevation.

An ultra-thin layer of water forms on the surface in contact with the water due to physical intermolecular attraction between the water and the polar substrate of the medium, leaving contaminants in the container. Depending on the molecular polarity and effective area of the medium, this film can rise to a height of at least several inches. If the surface curves horizontally, it advances even further, since attractive molecular forces no longer must overcome gravity. If it then turns downward, the film flows with increased velocity, indefinitely, with the assistance of gravity. At the lower, distal end of the surface, still with the assistance of gravity, the film can coalesce into a pooled liquid to drip or run off the surface into the collector.

The film on the above-described inverted U-shaped surface, acts as a nearly perfect elastomer. If the weight of the film on the downward flowing leg of the inverted "U" running to the collector is greater than the weight of the connected film on the upward flowing leg rising from the contaminated water, it will create upward elastomeric tension and stretching of the film on the upward leg with a force overcoming gravity, thus drawing the film up and over the top of the inverted "U" onto the downward leg and similar to a rope over a pulley, down to the collector to be released by gravity into it.

This process continues automatically, transferring purified water to the collector at a velocity dependent on the difference in weight of the upward and downward legs of the film. Velocity will slow, then stop, as the container empties. As the stretched film flows over the surface, energy is lost to friction so that the distance of travel, or, the total length of the inverted "U" limits the velocity of flow.

A greater medium effective surface area holds a greater volume of flowing film for a greater total flow rate at any given velocity. A larger medium pore size has a greater ambient air diffusion and convection rate for more effective aeration and/or evaporation. While we believe the physical principles are as taught above, we don't want to be bound by this.

In the case of sewage and some other water or gas in which the medium is immersed, is contaminated with organic chemicals, a coating of bacteria is grown on the surface of the medium over which the thin film flows. The organic contaminants, whether living microorganisms or non-living material, are consumed and metabolized by the coating of bacteria into carbon dioxide and water.

Water produced from sewage by this invention has nearly undetectable levels of the common sewage contamination parameters including odor, fecal coliform bacteria, biological oxygen demand and suspended solids. The purified product can then be disposed of without concern for human contact or environmental pollution. It can be reused for household, industrial or irrigation purposes or, discharged safely as normal surface precipitation run-off into storm sewers, ditches, streams or lakes. No separation or setback distances need be provided from wells, surface water, buildings or property lines, nor does it need particular soil or ground water conditions, as do standard systems.

Operation of this invention is cost free, requiring no outside power, energy, mechanical devices, nor regular maintenance. Relying on natural forces for operation, it will go indefinitely without attention. If, under unusual circumstances, maintenance should be required, it can easily be back-flushed, repaired, or replaced.

This device can work well alone, but the preferred embodiment uses a particular type of physical filter-biological reactor pretreatment. This container may be a cylinder, wedge or cone shape with the contaminated water introduced at the center or apex from which it keeps gradually through layers of saturated porous media toward the periphery. The first medium layer, or mass of medium is coarse with large pores. The water is pretreated here by settling, floatation, physical filtration, composting and fixed film and suspended biological reaction enough to be further treated in the following layer containing a finer pored medium without plugging by biological growth. The water is similarly treated in this second layer sufficiently to prevent plugging in the third layer with even freer pores, and so on. Each progressively finer layer has more surface layer, smaller pores, smaller interstitial distance and more efficient treatment, until the desired level of treatment is reached.

From the final, finest layer the film-forming medium surface with its thin, flowing film, extends into the air from immersed, saturated level to provide the final complete aerobic treatment described above.

Material for constructing these devices can be common and inexpensive, and may consist of: the large surfaced medium which may be well graded soil, sand or gravel; the container which may be a geomembrane over sculpted earth, or sculpted clay, or other soil with fine enough particle size to prevent the escape of untreated effluent, without a geomembrane. If reuse or direction to disposal of effluent is wanted, a collector and associated plumbing may be needed which could be a trough with pipe and fittings. If only disposal is wanted and there is sufficient unsaturated soil surrounding the apparatus, the substrate or medium for the thin film can be extended over the edge of the container into contact with the unsaturated soil to continue down to natural ground water or impermeable native soil layer.

Location of the invention is compatible with all types of construction. It may be in or under buildings, parking areas, or used for normal lawn, garden or agriculture, requiring no irrigation.

The device can be used to purify, concentrate, evaporate or aerate liquids or suspensions, or as an automatic self-starting nonpowered pump requiting only slight hydrostatic head to start and drive it. It can be used with aqueous or nonaqueous fluids and a range of hydrophilic to hydrophobic surface substrates.

The large surfaced medium can be selected and employed for catalytic or surface active treatment or chemical reaction of the liquid or solutes and suspensions. The large surface of the thin flowing film in contact with ambient air, vacuum, or other gas can provide opportunities for chemical reactions requiring large surface contact between gasses, liquids, and solids.

The container and collector can be made of any stable impermeable material such as metal or plastic. The medium could be any granular, porous, woven, or layered material such as metal, mineral, plastic, fabric, or open celled foam plastic, metal or glass.

Tubing can communicate from various regions in the saturated pretreatment area to the surface, to transfer gasses or sample effluent.

DETAILED DESCRIPTION OF THE DRAWINGS

Figure 1:
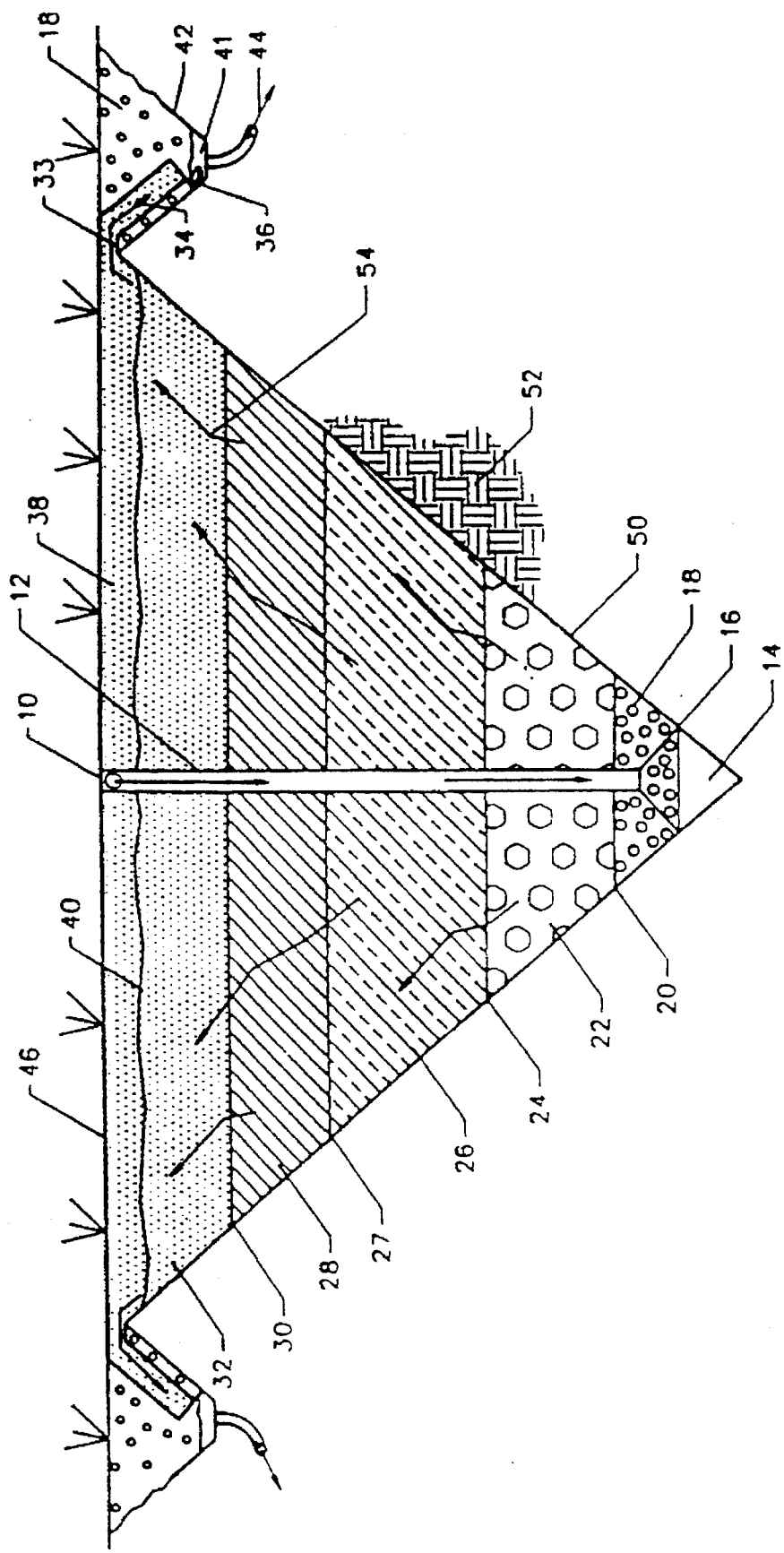
FIG. 1. Side section of cone or vertical wedge-shaped container with sand film surface rising up over the edge and down to collector.

In FIG. 1., sewage, septic tank effluent or other liquid to be processed flows into inlet (10) moving by slight hydrostatic force down the pipe (12) to the settling chamber (14) at the bottom, then through the perforated plate separator (16) into the coarse medium (18), in this case 2½"×1½" well washed drain rock, where further settling, physical filtration, composting, suspended and fixed film biological reaction treat to the extent that it can seep through a screen separator (20) with pore size similar to the finer medium, into the next freer layer (22), in this example ⅝"×⅜" well washed gravel where further similar treatment takes place allowing it to flow similarly through the next separator (24) into the next finer medium (26), in this case well washed sand with effective particle size <0.80–2.00 mm and a uniformity coefficient <1.5, without clogging, then similarly through a fabric separator (27) into a still finer medium (28) in this example, washed sand with an effective particle size <0.50–0.60 mm and uniformity coefficient of <1.6. Then it seeps through a fabric separator (30) into a film forming layer (32) in this case, of coarse to medium sand which extends over the edge of the container (33) to form the downward leg (34). The downward leg is enclosed in separator fabric (36) and supported on, and embedded in, drain rock (18) to protect it and admit ambient air.

The pretreated effluent forms a film on the upper unsaturated layer of sand (38), above the upper level of saturation (40), which is drawn laterally up over the edge (33) and onto the downward leg (34) to coalesce as free liquid at its lower tip which then pools (41) in the collector (42) to run out the outlet (44) to storage for muse. Ambient air convects and diffuses from ground level (46) through the interstices to aerate the film the container (48) and collector (42) in this example, are made of plastic geomembrane (50) supported by native soil (52). Arrows (54) indicate direction of water flow. Vertical tubes (56) for gas transport or effluent sampling in lower layers.

Figure 2:
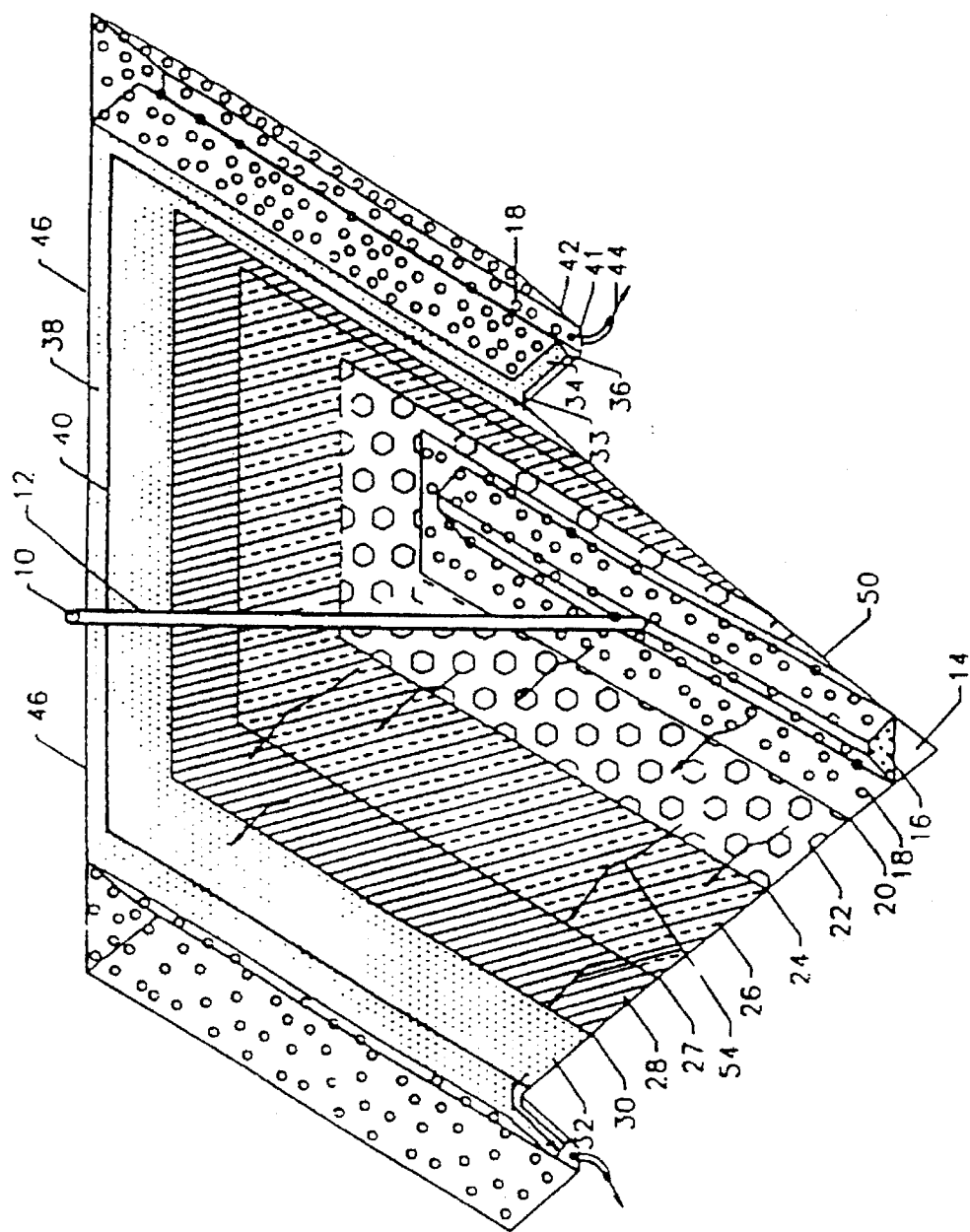
FIG. 2. Top, see-through, view of vertical wedge-shaped container of indeterminate length with sand film surface running along two opposite sides.

In FIG. 2., sewage, septic tank effluent or other fluid to be processed flows in inlet (10), down under slight hydrostatic pressure to the apex, through the perforated influent distribution pipe (11) that runs the length of the container (46)

then upward and outward through the pretreating layers indicated by lines showing intersections with geomembrane (13), as in FIG. 1., forming a thin film at the upper level of saturation (40) which flows outward and upward on the upper layers of unsaturated sand over the container edge (33) and down the downward leg (34) coalescing in the collector (42) buried in drain rock (18) to protect it and admit ambient air. Then it pools (41) to run out the outlet (44) to storage for reuse.

Figure 3:
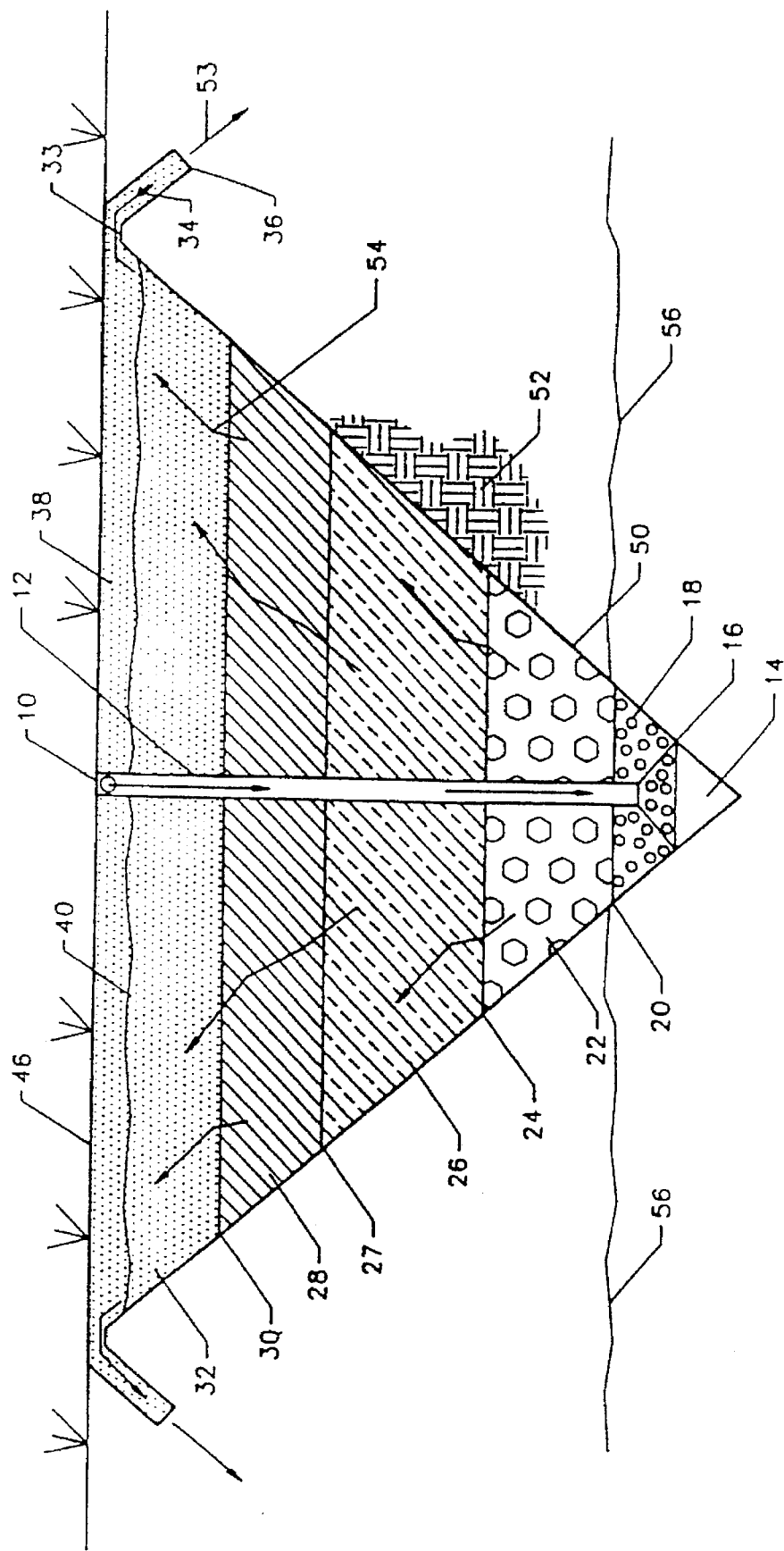
FIG. 3. Side section of cone or vertical wedge-shaped container with sand film surface flowing to unsaturated soil to join the local water table.

In FIG. 3., the principle is the same as FIG. 1., except that the purified effluent film (53) is guided to join local ground water (56) for disposal, not saved for reuse.

Figure 4:
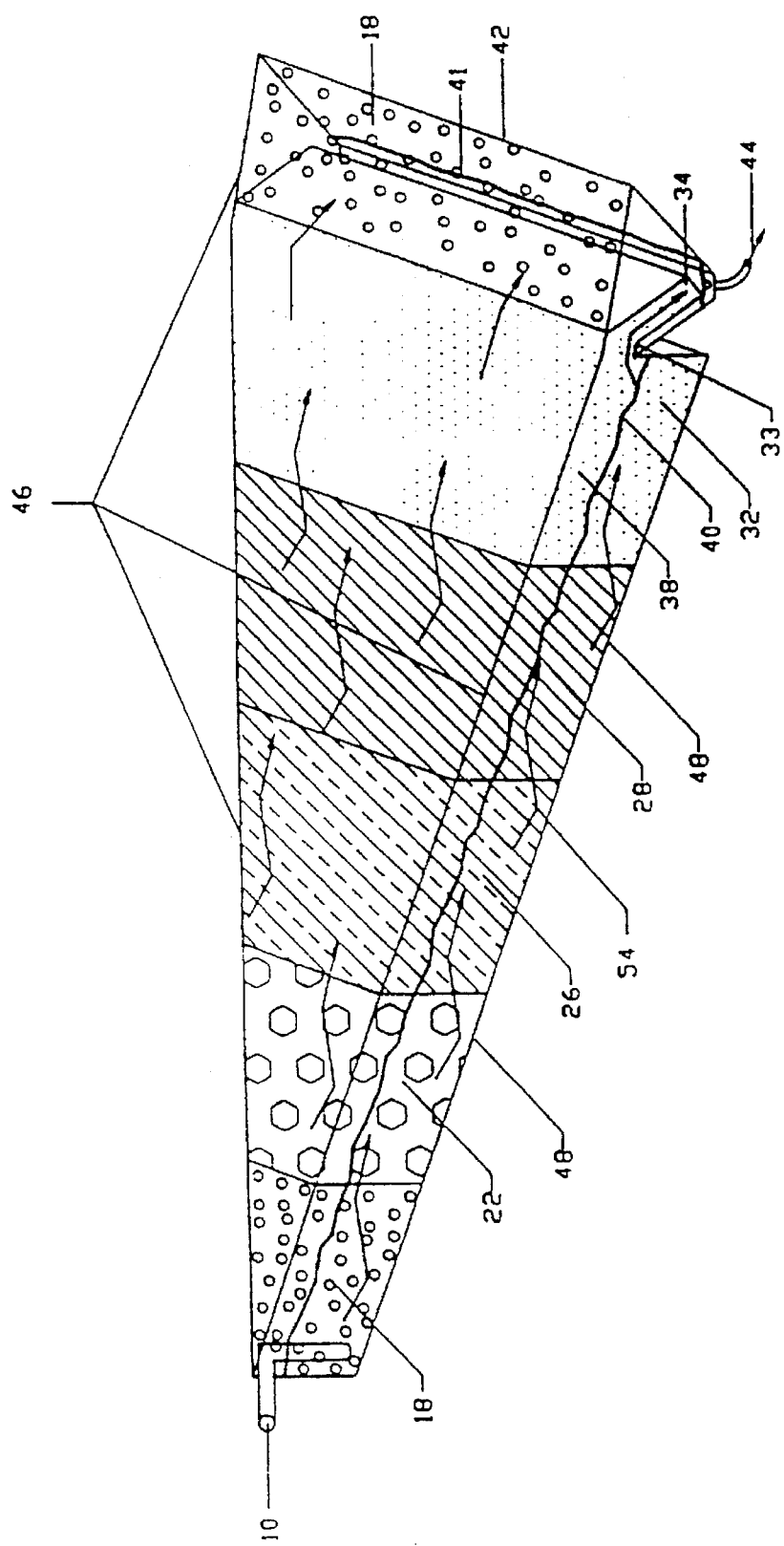
FIG. 4 Perspective view of horizontal wedge-shaped container with sand film surface over peripheral edge.

In FIG. 4., the fluid to be processed flows horizontally through the treatment layers laid out in a horizontal wedge- or pie-shaped container (48) with extra air exposure at the top of each layer. It forms a film that flows over the peripheral edge (33) then through the downward leg (34) as in previous figures.

Figure 5:
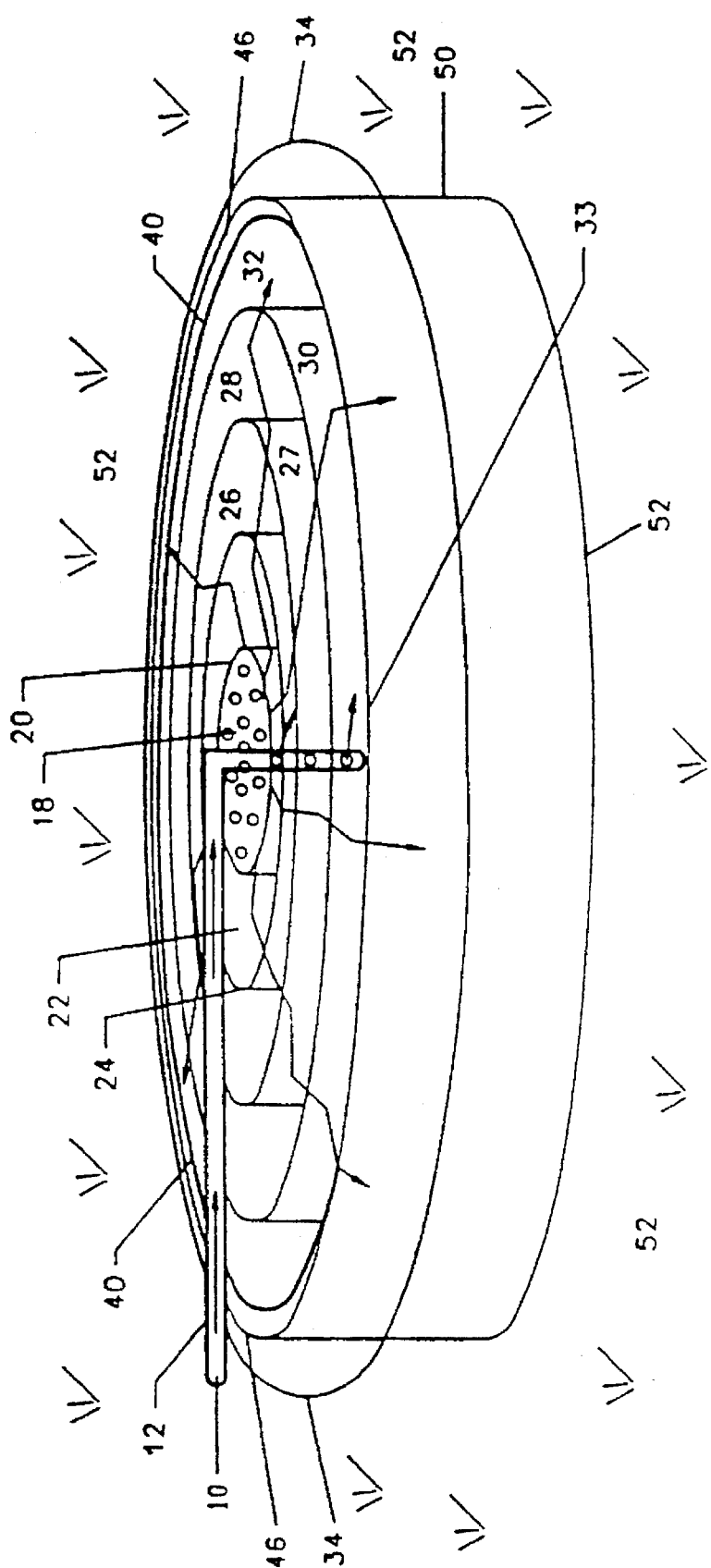
FIG. 5 Perspective view of cylinder shape with effluent going to local ground water.

In FIG. 5., the inlet is at the center of a cylinder to flow radially and axially over the peripheral edge onto the downward, thence as FIGS. 1, 2, 3, and 4.

Although particular preferred embodiments of the invention are herein disclosed for illustrative purposes, it is to be understood that all variations lying within the scope of these claims are contemplated.

We claim:

1. A method for treatment of wastewater, said wastewater of the type comprising organic matter and dissolved gases, said method comprising:
   (a) providing a granular or porous filter medium having interstitial pores, said granular or porous filter medium further comprising
      (i) two or more preselected media portions, said two or more preselected media portions comprising at least (A) a first media portion, and (B) a final media portion, said final media portion being finer in size than said first media portion, said final media portion having a larger surface layer area than said first media portion,
      (ii) a downward media leg having a lower tip portion,
   (b) providing a common container for said two or more preselected media portions, said common container having an edge portion, and said downward media leg adjacent said edge portion;
   (c) directing said wastewater into said first media portion;
   (d) allowing said wastewater to flow by hydraulic action from said first media portion to said final media portion, without saturating all of said final media portion with said wastewater;
   (e) allowing said wastewater to flow by hydrophilic action from said final media portion to said downward media leg;
   (f) wherein said wastewater flows in a thin film through said final media portion and thence into said downward leg portion, whereby said wastewater is effectively treated for removal of organic matter, so as to provide a treated wastewater effluent.

2. The method as set forth in claim 1, wherein said wastewater passes through a separator between each of said preselected media portions, said separator substantially preventing each of said preselected media portions from migrating into adjacent preselected media portions.

3. The method as set forth in claim 1, wherein said wastewater further comprises suspended particulates, and wherein said suspended particulates are substantially physically removed from said wastewater by said two or more preselected media portions.

4. The method as set forth in claim 1, wherein said porous hydrophilic medium provides sites for biological growth without plugging of said medium, so that at least a portion of said organic matter in said wastewater may be consumed by said biological growth.

5. The method as set forth in claim 1, wherein said dissolved gasses in said wastewater are substantially consumed by said biological growth.

6. The method as set forth in claim 1, further comprising the step of allowing ambient air to pass through said unsaturated final media portion to evaporate a portion of said wastewater.

7. A method for treatment of wastewater, said wastewater of the type comprising organic matter and associated dissolved gases, said method comprising:
   (a) providing a series of increasingly finer media portions in the direction of wastewater flow, said series of increasingly finer media portions each having a sufficiently coarse size to thereby provide a packed porosity of sufficient volume that substantially precludes clogging of the next finer media portion, said series of increasingly finer media portions comprising two or more preselected media portions, said two or more preselected media portions comprising at least (i) a first media portion and (ii) a final media portion, said final media portion being finer in size than said first media portion, said final media portion having a larger surface layer area than said first media portion, and
   (b) providing a common container for said two or more preselected media portions, said common container having an edge portion;
   (c) providing a downward leg portion adjacent said said edge portion;
   (d) directing said wastewater into said first media portion;
   (e) allowing said wastewater to flow by hydraulic action from said first media portion to said final media portion, without saturating all of said final media portion with said wastewater;
   (f) allowing said wastewater to flow by hydrophilic action from said final media portion to said downward leg portion;
   (g) and wherein the number, porosity, and volume of each of said preselected media portions is selected so as to allow said organic matter and said dissolved gasses to be substantially removed from said wastewater, so as to provide a treated wastewater effluent.

8. The method of claim 7, wherein said wastewater comprises sewage effluent.

9. The method of claim 1 or of claim 7, wherein said first media portion is selected from the group consisting of (a) rock, (b) gravel, (c) soil, (d) sand (e) glass, (f) plastic, (g) open cell foam, and (h) metal.

10. The method of claim 9, wherein said gravel comprises well washed drain rock.

11. The method of claim 10, wherein said well washed drain rock is approximately two and one-half inches by one and one-half inches in size.

12. The method of claim 1 or of claim 7, wherein said final media portion is selected from the group consisting of (a) rock, (b) gravel, (c) soil, (d) sand, (e) glass, (f) plastic, (g) open cell foam, and (h) metal.

13. The method as set forth in claim 12, wherein said sand comprises fine sand having an effective particle size from about 0.50 to about 0.60 mm.

14. The method as set forth in claim 13, wherein said fine sand has a uniformity coefficient of less than about 1.5.

15. The method as set forth in claim 1 or in claim 7, wherein said common container comprises an impervious liner.

16. The method as set forth in claim 1 or in claim 7, wherein said two or more porous filter media are inoculated with selected biota.

17. The method as set forth in claim 1 or in claim 7, wherein said downward leg portion comprises an impermeably lined channel.

18. The method as set forth in claim 1 or in claim 7, wherein said treated wastewater effluent is discharged for reuse.

19. The method as set forth in claim 18, wherein said treated wastewater effluent is reused for landscape irrigation.

20. A method for treatment of wastewater, said wastewater of the type comprising organic matter and dissolved gases, said method comprising:

(a) providing a container, said container having an edge portion;

(b) providing a downward media leg portion, said downward media leg portion (i) adjacent said edge portion, and (ii) containing therein at least one film forming layer portion;

(c) directing said wastewater into said container;

(d) allowing said wastewater to flow by hydrophilic action from said container to said downward media leg without saturating all of said at least one film forming layer portion with said wastewater;

(e) wherein said wastewater flows in a thin film through said at least one film forming layer portion, whereby said wastewater is effectively treated for removal of organic matter, so as to provide a treated wastewater effluent.

21. The method as set forth in claim 20, wherein said downward media leg portion is provided in a generally inverted U-shaped configuration, and wherein said inverted U-shaped configuration comprises a short upper end which extends downward into said container to place said at least one film forming layer portion in contact with said wastewater, and allowing said wastewater to flow hydrophilically upward through said short upper end of said downward media leg portion, and thence downward through a long end of said U-shaped downward media leg portion, so that said long end of said U-shaped downward media leg portion allows said wastewater to migrate downward and outward.

22. The method as set forth in claim 20, wherein said downward media leg portion is enclosed in a separator fabric.

23. The method as set forth in claim 20, wherein said downward media leg portion is supported on, and embedded in drain rock, so as to protect said downward media leg portion and to admit ambient air into said downward media leg portion.

24. The method as set forth in claim 20, wherein said film forming layer portion comprises sand.

25. The method as set forth in claim 24, wherein said sand comprises coarse to medium sand.

26. The method as set forth in claim 20, wherein said wastewater is drawn laterally up over said edge portion, and thence flows downwardly through said downward media leg portion, and then coalesces as a free liquid at a lower tip portion of said downward media leg portion.

27. The method as set forth in claim 26, wherein ambient air diffuses into said downward media leg portion, so as to create a mechanism for transport of gases from said wastewater as it traverses said downward media leg portion.

28. The method as set forth in claim 25, wherein said free liquid is discharged into the ground, for recharge of local groundwater.

29. The method as set forth in claim 25, wherein said free liquid is collected in a storage device for reuse.

* * * * *